C. A. MOREHOUSE.
CHAIN FASTENER.
APPLICATION FILED JAN. 23, 1920.

1,346,046.

Patented July 6, 1920.

Witnesses
R. A. Thomas.

Inventor
Clarence A. Morehouse
By Victor J. Evans
Attorney

UNITED STATES PATENT OFFICE.

CLARENCE AUGUSTUS MOREHOUSE, OF LAWRENCE, KANSAS.

CHAIN-FASTENER.

1,346,046.   Specification of Letters Patent.   Patented July 6, 1920.

Application filed January 23, 1920. Serial No. 353,621.

*To all whom it may concern:*

Be it known that I, CLARENCE AUGUSTUS MOREHOUSE, a citizen of the United States, residing at Lawrence, in the county of Douglas and State of Kansas, have invented new and useful Improvements in Chain-Fasteners, of which the following is a specification.

This invention relates to fastening devices, especially adapted for securing anti-skid chains upon wheels of automobiles or other vehicles.

An object of the invention is the provision of a fastening device, which will be positively held in closed position, so as to eliminate the annoyance due to the accidental separation of the chain ends.

Another object of the invention is the provision of a device of this character, which is simple in construction and operation and which may be used in connection with chains of various types.

Other objects and advantages of the invention will appear as the following description is read in connection with the accompanying drawings.

Figure 1:
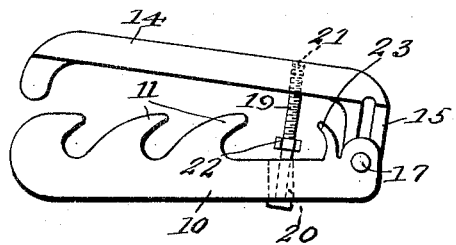
Figure 1 is a view in side elevation of a chain fastening or coupling member constructed in accordance with the present invention, the device being shown in open position.

Referring to the drawings in detail, wherein like characters of reference denote corresponding parts, the invention comprises a body member 10, which is provided with a plurality of spaced laterally extending hooks 11, the ends of the member 10 being bifurcated as at 12 and 13.

These hooks are adapted for insertion through links in one of the chain ends and for the purpose of holding the links in position, there is provided a bar 14. This bar is formed at one end with an angular extension 15, having formed therein an elongated slot 16. The end 15 of the bar is positioned within the bifurcated end 13 of the body member and is held therein by means of a pin 17.

For the purpose of adjusting the bar 14 with respect to the body member, there is provided a threaded stud 19, one end of which is swiveled within the body member as indicated at 20. The opposite end of this stud is threaded, for engagement with a threaded opening 21 provided in the bar 14. An operating member 22 is secured to the threaded stud to facilitate rotation.

Figure 3:
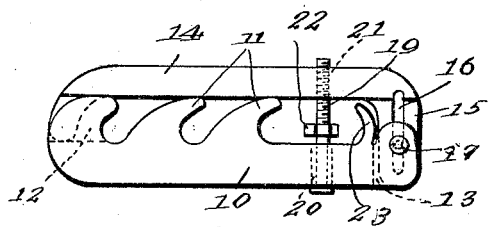
Fig. 3 is a view similar to Fig. 1 with the fastener closed.
Figure 2:
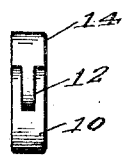
Fig. 2 is an end view of the same.
Figure 4:
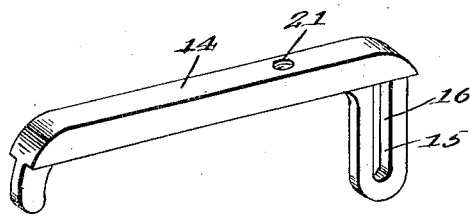
Fig. 4 is a detail view of the bar.

One end of the tire chain is adapted to be secured around the pivoted end of the bar 14 and for the purpose of preventing wear upon this end of the device, there is provided a hook 23 which passes through the chain link. When the parts are in the position shown in Fig. 1, the opposite end of the chain may be secured to either of the hooks 11 so as to provide proper adjustment of the chain, whereupon through the operation of the threaded stud 19, the fastener may be closed as illustrated in Fig. 3.

The invention is susceptible of various changes in its form, proportions and minor details of construction, and the right is herein reserved to make such changes as properly fall within the scope of the appended claims.

Having described the invention what is claimed is:

1. A chain fastener comprising a body member, a plurality of spaced hooks carried thereby, a bar slidably and pivotally secured to one end of the body member and rotatable means extending through said body member and bar, whereby the bar may be moved and held in engagement with the ends of the hooks to provide closed chain receiving openings.

2. A chain fastener comprising a body member, a plurality of spaced hooks carried thereby, bifurcated extremities located at each end of the body member, a bar adapted to contact with the ends of the spaced hooks, a slotted annular extension formed on said bar for said pivotal and sliding engagement with the bifurcation at one end of the body member, an angular extension also located at the opposite end of the bar for removable engagement with the bifurcation at the opposite end of the body member and means for holding said body member and bar against relative movement.

In testimony whereof I affix my signature.

CLARENCE AUGUSTUS MOREHOUSE.